Figure 1:
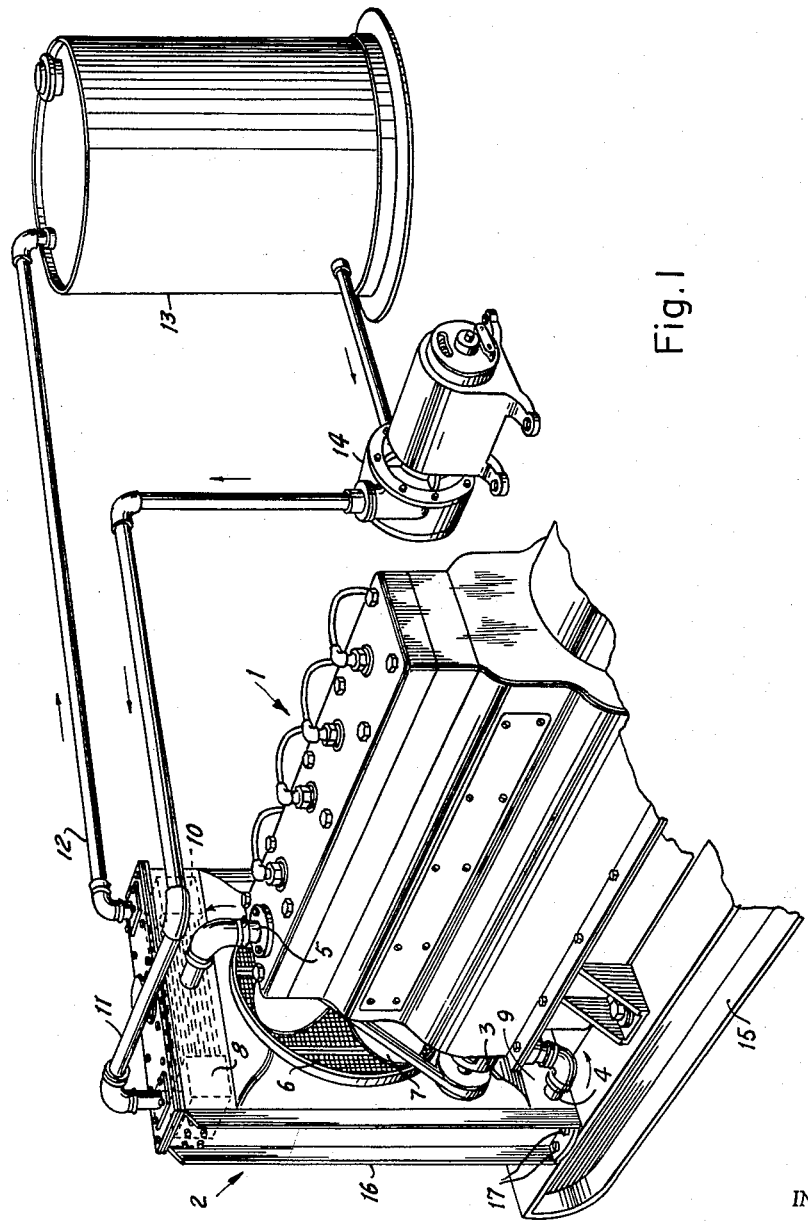

Nov. 15, 1960 T. W. HUFFMAN, JR., ET AL 2,960,315
SUPPLEMENTAL COOLING SYSTEM FOR ENGINE RADIATORS
Filed June 30, 1958 2 Sheets-Sheet 1

INVENTOR
T. W. Huffman, Sr.
T. W. Huffman, Jr.

BY

ATTORNEY

2,960,315

SUPPLEMENTAL COOLING SYSTEM FOR ENGINE RADIATORS

Thomas W. Huffman, Jr., and Thomas W. Huffman, Sr., both of 1821 N. Sam Houston St., Odessa, Tex.

Filed June 30, 1958, Ser. No. 745,626

1 Claim. (Cl. 257—215)

This invention relates to an engine radiator, and it concerns more particularly, in combination with an engine radiator, a supplemental cooling system for pre-cooling engine cooling fluid delivered to the radiator.

The apparatus of this invention is an improvement of the apparatus described and claimed in our co-pending application, Serial No. 535,028, filed September 19, 1955, now Patent No. 2,887,097.

In large heavy duty stationary engines of the diesel and internal combustion types, such as those commonly used in the oil fields, for example, the work load handled by the engine, together with prevailing atmospheric conditions, may be such that insufficient cooling of the engine cooling fluid is obtained by forcing air through the radiator in indirect heat exchange relation with the engine cooling fluid.

An object of the invention is to provide, in combination with an engine radiator having a core for cooling engine cooling fluid by indirect heat exchange with atmospheric air forced through the core, and tanks for cooling fluid positioned above and below the core and communicating with the passages provided therein for the circulation of cooling fluid, whereby cooling fluid is supplied to the core from the upper tank, means for pre-cooling the cooling fluid in the upper tank before passing it through the core.

Another object of the invention is to provide, in combination with an engine radiator having a core for cooling engine cooling fluid by indirect heat exchange with atmospheric air forced through the core, and tanks for cooling fluid positioned above and below the core and communicating with the passages provided therein for the circulation of cooling fluid, whereby cooling fluid is supplied to the core from the upper tank, means for pre-cooling the cooling fluid in the upper tank before passing it through the core comprising a tube bundle in the upper tank adapted to pre-cool the cooling fluid by indirect heat exchange with a cooler fluid, a fluid supply tank having a substantially larger capacity than the radiator, and means for circulating a cooler fluid from the fluid supply tank to the tube bundle and back to the fluid supply tank.

Another object of the invention is to provide an arrangement of the type described in which the upper tank of the radiator has a removable panel, which may comprise the top thereof, or alternatively, the front or rear wall, whereby the interior of the upper tank is readily accessible for cleaning and for other purposes, without dismantling the radiator.

Another object of the invention is to provide an arrangement of the type described in which the upper tank of the radiator has a removable panel, which may comprise the top thereof, or alternatively, the front or rear wall, and the tube bundle is received bodily in the upper tank and is removably secured therein whereby it may be readily removed for cleaning and for other purposes.

Another object of the invention is to provide an arrangement of the type described in which filters, baffles or the like may be readily positioned in the upper tank of a radiator, in the path of the circulating engine cooling fluid, whereby scale, rust, sludge and other foreign matter may be trapped and removed from the circulating engine cooling fluid.

Another object of the invention is to provide an arrangement of the type described which facilitates use in the radiator of materials capable of affording anodic and cathodic protection, whereby corrosion and electrolytic decomposition of the radiator is retarded.

Another object of the invention is to provide an arrangement of the type described which is capable of being readily incorporated in existing radiators upon alteration of the upper tank of the radiator as necessary to provide a flanged opening therein.

Another object of the invention is to provide an arrangement of the type described in which a number of functions are capable of being carried out simultaneously in the upper tank of an existing radiator, and in which the need for separate tanks corresponding to each function is eliminated.

Figure 2:
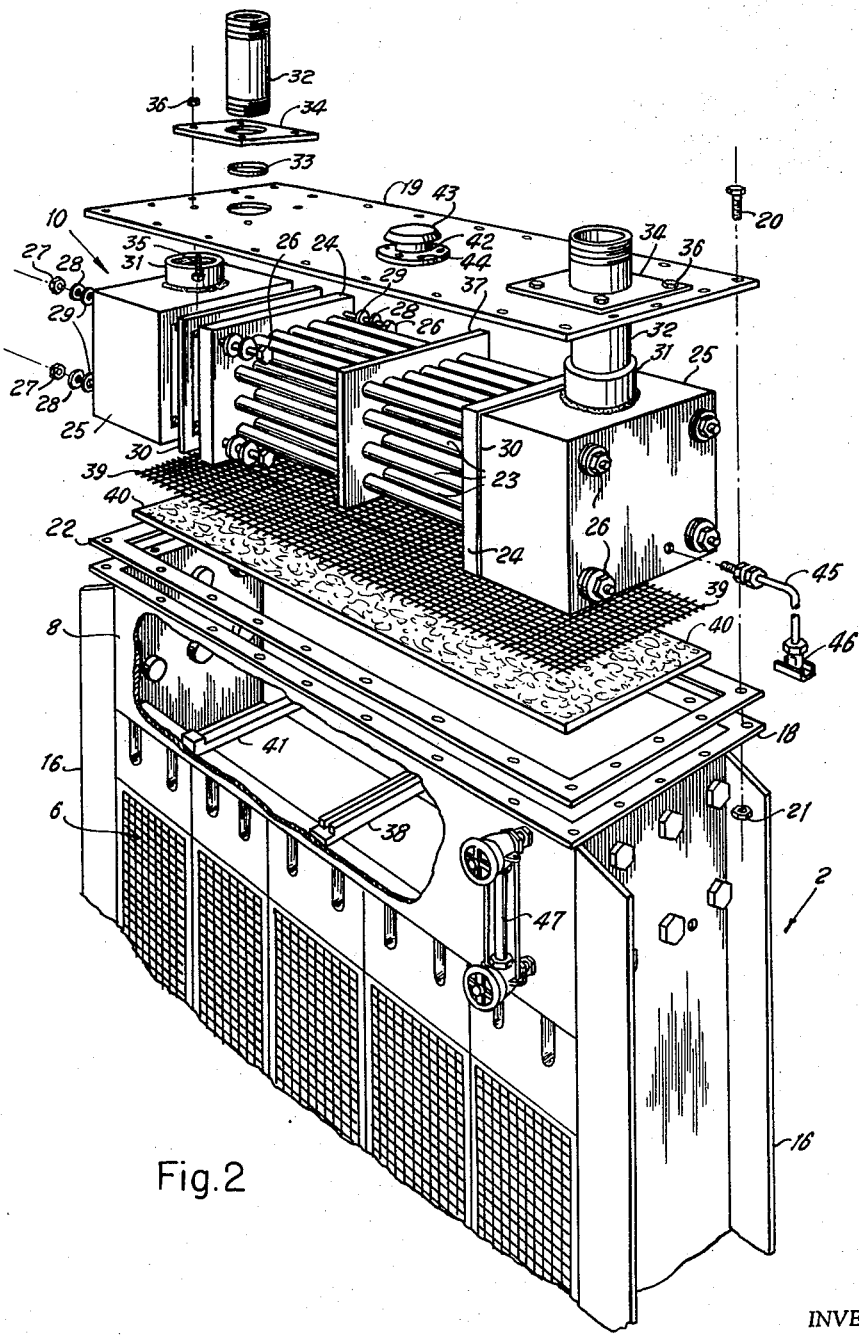

The invention will be readily understood by referring to the following description and the accompanying drawing, in which:

Figure 1 is a fragmentary perspective view of an engine having a supplemental cooling system embodying the invention; and Figure 2 is a fragmentary exploded perspective view, on an enlarged scale, of the engine radiator shown in Figure 1, showing the upper tank and the cover therefor, and a tube bundle receivable bodily in the tank.

Referring to Figure 1 of the drawing, the numeral 1 designates generally an internal combustion engine, which is of conventional construction and has a radiator, indicated generally by the numeral 2. A water pump 3 withdraws engine cooling fluid from the bottom of the radiator 2, as at 4, and circulates it through the cooling jacket of the engine 1, from which it is returned to the top of the radiator 2, as at 5.

The radiator 2 has a core 6, in which the engine cooling fluid is cooled by indirect heat exchange with atmospheric air forced through the core 6 by a fan 7, and tanks 8 and 9 for engine cooling fluid positioned above and below the core 6 and communicating with passages provided therein for the engine cooling fluid, whereby engine cooling fluid is delivered to the core 6 from the upper tank 8.

A tube bundle 10 is received bodily in the upper tank 8. The tube bundle 10 is connected at its ends to an inlet pipe 11 and a discharge pipe 12. A fluid supply tank 13, which is of larger capacity than the radiator 2 and is adapted to contain a cooler fluid, is connected to the inlet pipe 11 and the discharge pipe 12. A pump 14 is operatively connected to the inlet pipe 11 whereby the cooler fluid may be circulated from the fluid supply tank 13 to the tube bundle 10 and back to the fluid supply tank 13.

The engine 1 is mounted on a base 15, which advantageously may be in the form of a skid, and the radiator 2 is supported at its sides by a pair of vertically disposed channel-shaped members 16, which are connected by bolts 17 to the base 15 and extend upwardly therefrom.

As shown in Figure 2 of the drawing, the upper tank 8 of the radiator 2 is open at the top, the top wall thereof being cut away, in the case of an existing radiator, and an outwardly extending peripheral flange 18 is secured to the upper edges of the front, rear and side walls of the upper tank 8 about the top opening thereof. A cover plate 19 is secured to the flange 18 of the upper tank 8 by a plurality of bolts 20, which are inserted through aligned openings provided therefor in the flange 18 and the cover plate 19 and have nuts 21 applied thereto. A gasket 22 is positioned between the flange 18 and the cover plate 19.

The tube bundle 10 includes a plurality of tubes 23, which are arranged parallel to each other and have their ends secured in openings provided therefor in a pair of header plates 24. A header box 25 is secured to each of the header plates 24 by a plurality of bolts 26, which are inserted through aligned openings provided therefor in the header plates 24 and the header boxes 25 and each have a nut 27, metal washers 28 and resilient washers 29 applied thereto. A gasket 30 is positioned between each of the header plates 24 and the corresponding header box 25.

The inlet pipe 11 and the outlet pipe 12 are connected to the tube bundle 10 by interchangeable inlet and outlet connections each consisting of a collar 31, which is rigidly connected to one of the header boxes 25, and a nipple 32, which is threaded at its ends and one end of which is connected to the collar 31. The nipples 32 are each inserted through an opening provided therefor in the cover plate 19. A pair of resilient O rings 33 each surround one of the nipples 32 and is clamped between the top of the cover plate 19 and the under side of a plate 34, which is secured to the cover plate 19 by a plurality of bolts 35 having nuts 36 applied thereto.

The tubes 23 are supported intermediate their ends by a spacer plate 37, which has openings therein surrounding the tubes 23 and is supported by a rack 38 provided therefor in the upper tank 8.

The tube bundle 10 is secured in the upper tank 8 by engagement of the cover plate 19 with upwardly facing shoulders comprising the upper ends of the collars 31.

A filter pad 39 is positioned in the upper tank 8 below the tube bundle 10, and a filter screen 40 is positioned between the filter pad 39 and the tube bundle 10.

A bar 41, which is formed of material capable of affording anodic and cathodic protection, and which retards corrosion and electrolytic decomposition, is positioned in the upper tank 8 below the filter pad 39.

A filling neck 42, which has a cap 43, is attached to the cover plate 19 by screws 44.

A drain conduit 45, which has a valved outlet 46, is connected to one of the header boxes 25.

A sight gauge 47 is connected to the front wall of the upper tank 8 whereby the fluid level in the upper tank 8 may be determined by visual inspection.

The invention may be modified in various ways without departing from the spirit and scope thereof.

What is claimed is:

In combination with an engine having a radiator comprising a core for cooling engine cooling fluid by indirect heat exchange with atmospheric air forced through the core, and tanks for cooling fluid positioned above and below the core and communicating with passages therein for the circulation of cooling fluid, means for supplying cooling fluid to the upper tank from the engine, and means for supplying cooling fluid from the lower tank to the engine, means for additionally cooling fluid circulated to and from the radiator by indirect heat exchange with a cooler fluid comprising an opening in the upper tank substantially co-extensive with one side thereof whereby the interior of the tank is adapted to be exposed, a removable panel normally closing the opening, a tube bundle received bodily in the upper tank and adapted to be inserted in the tank and withdrawn therefrom through the opening, a fluid supply tank adapted to contain a relatively large quantity of cooling fluid having a temperature substantially lower than the temperature of the cooling fluid supplied to the upper tank from the engine, and means for circulating cooling fluid from the fluid supply tank to the tube bundle and back to the fluid supply tank.

References Cited in the file of this patent

UNITED STATES PATENTS

| | | |
|---|---|---|
| 1,400,878 | Howe | Dec. 20, 1921 |
| 1,593,699 | Leibovitz | July 27, 1926 |
| 1,900,504 | Kirgan | Mar. 7, 1933 |
| 2,459,123 | Bates et al. | Jan. 11, 1949 |
| 2,498,594 | Tomel | Feb. 21, 1950 |
| 2,522,948 | Hoffmann | Sept. 19, 1950 |
| 2,887,097 | Huffman et al. | May 19, 1959 |

FOREIGN PATENTS

| | | |
|---|---|---|
| 346,197 | Great Britain | Apr. 9, 1931 |